(12) United States Patent
Blazer et al.

(10) Patent No.: US 11,994,729 B2
(45) Date of Patent: May 28, 2024

(54) OPTICAL FIBER CABLE WITH PARALLEL RIBBON SUBUNITS

(71) Applicant: CORNING RESEARCH & DEVELOPMENT CORPORATION, Corning, NY (US)

(72) Inventors: Bradley Jerome Blazer, Granite Falls, NC (US); Harold Edward Hudson, II, Conover, NC (US); Christopher Mark Quinn, Hickory, NC (US); David Alan Seddon, Hickory, NC (US); Kenneth Darrell Temple, Jr., Newton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/077,462

(22) Filed: Dec. 8, 2022

(65) Prior Publication Data
US 2023/0109527 A1 Apr. 6, 2023

Related U.S. Application Data

(60) Continuation of application No. 17/510,979, filed on Oct. 26, 2021, now Pat. No. 11,543,608, which is a
(Continued)

(51) Int. Cl.
*G02B 6/44* (2006.01)

(52) U.S. Cl.
CPC ......... *G02B 6/4432* (2013.01); *G02B 6/4403* (2013.01); *G02B 6/4404* (2013.01); *G02B 6/441* (2013.01); *G02B 6/4411* (2013.01); *G02B 6/4433* (2013.01); *G02B 6/4454* (2013.01); *G02B 6/4471* (2013.01)

(58) Field of Classification Search
CPC .... G02B 6/4403; G02B 6/4404; G02B 6/441; G02B 6/4411; G02B 6/4432; G02B 6/4433; G02B 6/4454; G02B 6/4471
See application file for complete search history.

(56) References Cited

U.S. PATENT DOCUMENTS

| 4,078,853 A | 3/1978 | Kempf et al. |
| 5,517,591 A | 5/1996 | Wagman et al. |

(Continued)

FOREIGN PATENT DOCUMENTS

| CN | 201689204 U | 12/2010 |
| CN | 102313944 A | 1/2012 |

(Continued)

OTHER PUBLICATIONS

European Patent Application No. 20784481.2, Office Action dated Nov. 4, 2022; 9 pages; European Patent Office.
(Continued)

*Primary Examiner* — Ryan A Lepisto
(74) *Attorney, Agent, or Firm* — William D. Doyle

(57) ABSTRACT

An optical cable is provided. The optical cable includes an outer cable body jacket and a plurality of optical fiber subunits. The optical fibers within each subunit are stranded relative to each other and are located within a thin subunit jacket. A plurality of unstranded optical fiber subunits are located within the cable jacket.

16 Claims, 4 Drawing Sheets

Related U.S. Application Data division of application No. 16/826,587, filed on Mar. 23, 2020, now Pat. No. 11,169,343.

(60) Provisional application No. 62/826,169, filed on Mar. 29, 2019.

(56) References Cited

U.S. PATENT DOCUMENTS

| | | | |
|---|---|---|---|
| 5,531,064 | A | 7/1996 | Sawano et al. |
| 5,621,841 | A | 4/1997 | Field |
| 6,052,502 | A | 4/2000 | Coleman |
| 6,141,472 | A | 10/2000 | Ishikawa et al. |
| 6,185,352 | B1 | 2/2001 | Hurley |
| 6,215,932 | B1 | 4/2001 | Hardwick et al. |
| 6,226,431 | B1 * | 5/2001 | Brown ............... G02B 6/4411 385/112 |
| 6,256,439 | B1 | 7/2001 | Brown et al. |
| 6,317,542 | B1 * | 11/2001 | Hardwick, III ...... G02B 6/4411 385/112 |
| 6,434,307 | B1 | 8/2002 | Church |
| 6,487,348 | B1 | 11/2002 | Jackson |
| 6,922,511 | B2 | 7/2005 | Rhoney et al. |
| 7,231,119 | B2 | 6/2007 | Rhoney et al. |
| 8,559,778 | B2 | 10/2013 | Hurley et al. |
| 9,690,061 | B2 | 6/2017 | Hurley et al. |
| 2012/0106906 | A1 | 5/2012 | Sakabe et al. |
| 2016/0041354 | A1 | 2/2016 | Guenter et al. |
| 2017/0235068 | A1 | 8/2017 | Weimann et al. |
| 2018/0321455 | A1 | 11/2018 | Cignarale et al. |
| 2020/0142144 | A1 | 5/2020 | Blazer et al. |

FOREIGN PATENT DOCUMENTS

| | | |
|---|---|---|
| CN | 102472877 A | 5/2012 |
| CN | 207799177 U | 8/2018 |
| CN | 111033342 A | 4/2020 |
| EP | 1085356 A2 | 3/2001 |
| WO | 2019/010291 A1 | 1/2019 |

OTHER PUBLICATIONS

International Search Report and Written Opinion of the International Searching Authority; PCT/US2020/023894; dated Jun. 15, 2020; 8 Pages; Commissioner for Patents.

Chinese Patent Application No. 202080035885.2, Office Action dated Dec. 20, 2023, 4 pages (English Translation only), Chinese Patent Office.

* cited by examiner

OPTICAL FIBER CABLE WITH PARALLEL RIBBON SUBUNITS

CROSS-REFERENCE TO RELATED APPLICATIONS

This application is a Continuation of U.S. patent application Ser. No. 17/510,979 filed Oct. 26, 2021, which is a Divisional of U.S. patent application Ser. No. 16/826,587 filed Mar. 23, 2020, now U.S. Pat. No. 11,169,343, which claims the benefit of priority under 35 U.S.C. § 119 of U.S. Provisional Application Ser. No. 62/826,169 filed on Mar. 29, 2019, the content of which is relied upon and incorporated herein by reference in its entirety.

BACKGROUND

The disclosure relates generally to optical communication cables and more particularly to optical communication cables including multiple optical fiber subunits. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to an optical communication cable. The optical communication cable includes an outer cable jacket and a plurality of optical fiber ribbon subunits surrounded by the outer cable jacket. Each optical fiber ribbon subunit includes a subunit jacket defining a subunit passage and a plurality of optical fiber ribbons located within the subunit passage. The plurality of optical fiber ribbons is arranged in a ribbon stack within the subunit passage, the ribbon stack being stranded in a twisting pattern longitudinally within the subunit passage such that a longitudinal length of each of the plurality of optical fiber ribbons is greater than a longitudinal length of the subunit jacket and greater than a longitudinal length of the outer cable jacket. The plurality of optical fiber ribbon subunits are unstranded and run substantially parallel within the outer cable jacket such that a longitudinal length of each subunit jacket is substantially the same as the longitudinal length of the outer cable jacket.

Aspects of the present disclosure relate to a method of forming an optical communication cable. The method includes stranding a first plurality of fiber optic ribbons around each other to form a first stranded optical fiber ribbon group. The method includes extruding a subunit jacket around the first stranded optical fiber ribbon group, forming a first optical fiber ribbon subunit. The method includes stranding a second plurality of fiber optic ribbons around each other to form a second stranded optical fiber ribbon group. The method includes extruding a subunit jacket around the second stranded optical fiber ribbon group, forming a second optical fiber ribbon subunit. The method includes providing the first optical fiber ribbon subunit and the second optical fiber ribbon subunit to a cable jacket extruder without stranding either the first optical ribbon subunit or the second optical fiber ribbon. The method includes extruding an outer cable jacket around the unstranded first optical fiber ribbon subunit and the unstranded second optical fiber ribbon subunit.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various aspects and embodiments of an optical communication cable (e.g., a fiber optic cable, an optical fiber cable, etc.) are shown. In general, the cable embodiments disclosed herein are configured to support a relatively large number of optical fibers within a relatively small space while providing two or more unstranded (such as not helically or SZ stranded) optical fiber subunits that run substantially parallel to one another and organize groups of optical fibers within the cable constructions.

In accordance with aspects of the present disclosure, unstranded optical fiber subunits facilitate fiber access and efficient routing of groups of optical fibers within crowded application spaces, such as server racks, telecommunications cabinets, etc. By not stranding each subunit within the cable jacket, a less complicated, easier to access, and routable optical fiber subunit is provided. In particular, the non-stranded subunits discussed herein allow for the installer to route the subunit as needed within an application space (e.g., server rack, telecommunications cabinet, etc.) without unwrapping each subunit from other subunits within the cable construction. The design discussed herein provides functional advantages over aspects of conventional cable designs in which optical fiber units (such as buffer tubes containing optical fibers) are stranded around one another or around a central strength member, typically in a helical or SZ stranding pattern, within the cable jacket.

In accordance with yet other aspects of the present disclosure, cable designs are defined in which a relatively small portion of the internal cross-sectional area of the cable jacket (or other surrounding cable layer) is occupied by the optical fibers of the unstranded optical fiber subunits. Applicant has determined that ranges of internal cross-sectional areas occupied by the optical fibers of the subunits discussed herein provide sufficient free space to allow for the subunits to shift and assume low stress positions during cable bending, and thus, provides good attenuation performance, even though the subunits are unstranded.

Figure 1:
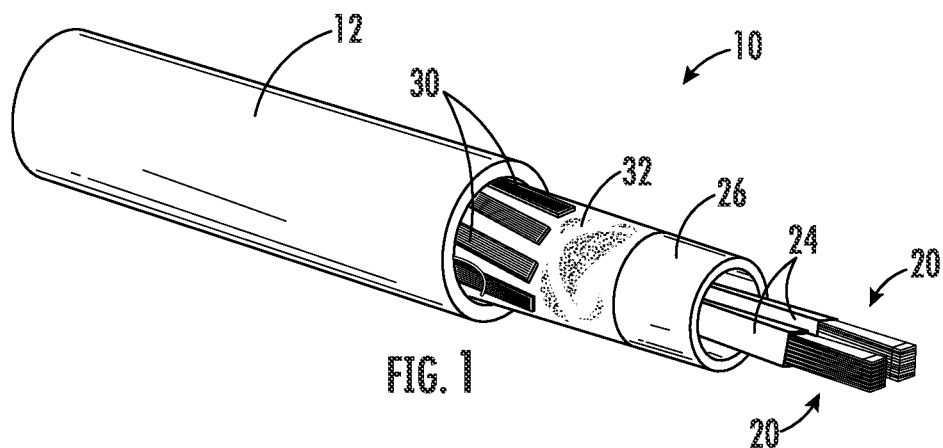
FIG. 1 is a perspective view of an optical fiber cable according to an exemplary embodiment.
Figure 2:
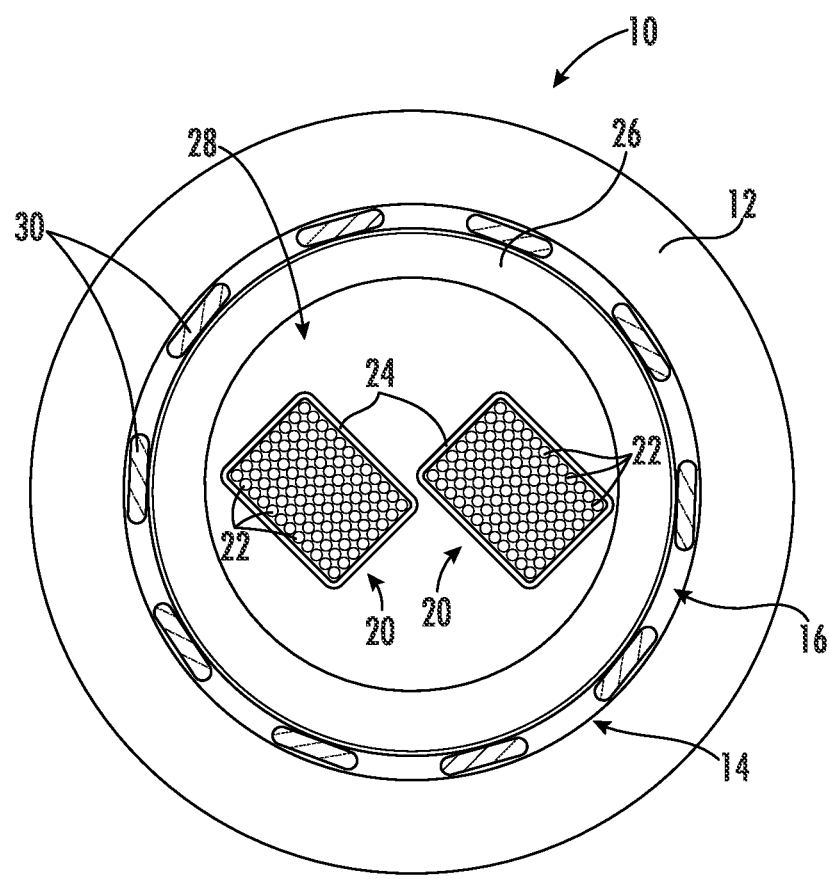
FIG. 2 is a cross-sectional view of the cable of FIG. 1 according to an exemplary embodiment.

Referring to FIGS. 1 and 2, an optical communication cable, shown as cable 10, is shown according to an exemplary embodiment. Cable 10 includes an outer cable layer or jacket, shown as cable jacket 12, having an inner surface 14 that defines an inner passage or cavity, shown as central bore 16. As will be generally understood, inner surface 14 of jacket 12 defines an internal area or region within which the various cable components discussed below may be located.

In various embodiments, cable 10 includes a plurality of optical fiber subunits, shown as optical fiber subunits 20. In general, as shown best in FIG. 2, each subunit 20 includes a plurality of optical fibers, shown as a plurality of optical fiber ribbons 22. As shown in FIG. 2, optical fiber ribbons 22 each include a plurality of optical fibers supported in an aligned array via a polymer ribbon matrix material.

Each subunit 20 also includes a subunit jacket 24 that defines a subunit passage, and the optical fiber ribbons 22 of each subunit are located within subunit jacket 24. In various embodiments, subunit jacket 24 may be a relatively thin layer of continuous and contiguous polymer material (e.g., contiguous circumferentially and longitudinally for a longitudinal length of at least 10 cm along the length of the cable) that surrounds optical fiber ribbons 22 closely to contain ribbons 22 with limited compression force such that the plurality of ribbons 22 act as a unitary subunit while ribbon to ribbon friction is sufficiently reduced to allow some longitudinal movement of ribbons during bending to prevent buckling.

In various embodiments, subunit jacket 24 is formed from solid or unfoamed polymer material and may have a thickness of between 0.005 mm and 0.5 mm. In specific embodiments, subunit jacket 24 is formed from solid or unfoamed polymer material that has a thickness between 0.2 mm and 0.35 mm. In other embodiments, subunit jacket 24 may be formed from a foamed material (e.g., a foamed polymer material) and may have a thickness of up to 1 mm, and in these embodiments, the foamed subunit jacket 24 may provide at least some of the space filling and compressive load bearing functionality of foam rods 56 that are discussed in more detail below. In accordance with yet other aspects of the present invention, the subunit jacket 24 may be a multilayered jacket comprising more than one layer of solid polymer material and/or a combination of solid and foamed materials.

In various embodiments, subunit jacket 24 is a thin jacket of extruded material that cools to provide a limited inwardly directed force on to ribbons 22. The inwardly directed force provided by this embodiment of subunit jacket 24 acts to prevent/resist unraveling of the stranded ribbons 22 while allowing sufficient movement of the individual ribbons in the stack during bending. Thus, in this manner (and unlike loose buffer tubes) subunit jacket 24 generally conforms to the shape or outer perimeter of the group or stack of optical fiber ribbons 22 within each subunit. In specific embodiments, subunit jacket 24 is formed from an extrudable polymer material having a thickness as discussed above and a modulus of elasticity of less than 800 MPa at room temperature (e.g., 70 degrees F.). Applicant has found that a subunit jacket formed from a material of this thickness and modulus is capable of holding together the subunit, while conforming to the shape of the internal optical fiber ribbons, while also providing a subunit jacket that can be easily opened manually by a user (e.g., peelable) to access the optical fiber ribbons for splicing, connection, etc.

It should be understood that a wide variety of optical fiber elements may be contained in each subunit 20 of the cables discussed herein. In accordance with aspects of the present disclosure, each subunit 20 may include a plurality of loose, individual optical fibers surrounded by the subunit jacket 24. In other embodiments, each subunit 20 may include flexible or rollable optical fiber ribbons, which are different from standard optical ribbons in that the rollable ribbons do not typically have a solid matrix surrounding the entire array of fibers forming the ribbon. Rather, the individual fibers in each rollable ribbon may be bonded at intermittent or spaced intervals such that individual or groups of fiber may be folded or rolled toward other fibers in the array of fibers. In various embodiments, the cables discussed herein may include more than two subunits 20.

In yet other embodiments, multiple subunits 20 of the cables discussed herein may be grouped or attached together for example to further facilitate handling. In one such embodiment, subunit jackets 24 of each subunit 20 may be formed from a contiguous portion material binding the subunits together. In another embodiment, subunit jackets 24 of each subunit 20 may be bonded together by other means, such as additional segments of joining thermoplastic material or adhesives. In another embodiment, an additional thin sheath of material may be extruded around subunit jackets 24, binding multiple subunits 20 together.

As noted above, optical fiber ribbons 22 and subunits 20 are arranged within cable 10 in an inventive manner that provides a combination of functional benefits. For example, within each subunit 20, optical fiber ribbons 22 may be grouped by stacking a plurality of ribbons into a ribbon group that is stranded to twist longitudinally within the passage defined by subunit jackets 24. However, the subunits 20 are not stranded around or relative to each other within cable jacket 12. In other words, subunits 20 are not stranded together (i.e., twisted or intertwined with each other) along their longitudinal length during cable jacket extrusion resulting in subunits 20 that run in a substantially parallel manner with each other along the length of cable 10. The lack of stranding of subunits 20 within cable jacket 12 may define an arrangement in which a longitudinal length of each subunit jacket 24 is substantially the same (e.g., within 1%) as the longitudinal length of outer cable jacket 12. In accordance with other aspects of the present disclosure, the subunits 20 may be manufactured to be longer than a length of cable jacket 12 such that the subunits 20 may extend beyond the protection of the cable jacket 12.

Referring to the specific embodiment shown in FIG. 1 and FIG. 2, cable 10 is configured as a cable suitable for indoor use. In specific embodiments, cable 10 may be a flame retardant indoor cable or a flame retardant indoor/outdoor cable. In such embodiments, cable 10 may include a buffer tube 26 defining a buffer tube passage 28. In such embodiments, subunits 20 are located within buffer tube passage 28, and outer cable jacket 12 surrounds buffer tube 26. In such embodiments, because subunits 20 are not stranded together within cable jacket 12, subunits 20 are also not stranded together within buffer tube 26. Thus, this arrangement results in a cable in which the longitudinal length of each subunit jacket 24 may be substantially the same (e.g., within 1%) as a longitudinal length of buffer tube 26.

In a specific embodiment, cable 10 includes one or more strands 30, such as a tensile strength strand (e.g., aramid yarn), or water blocking yarn. In various embodiments, cable 10 includes a layer of water blocking tape 32 located between strands 30 and buffer tube 26. In accordance with yet other aspects of the present disclosure, the water blocking tape 32 acts as a friction increasing layer to facilitate maintenance of the circumferential spacing of strands 30 during cable formation, installation and maintenance.

Referring to FIG. 2, in specific embodiments, cable 10 may include only two subunits 20, and in a specific embodiment, each subunit 20 includes at least 8 optical fibers. In various embodiments wherein the subunits include ribbons, each optical fiber ribbon 22 includes at least 8 optical fibers, and in a specific embodiment, each optical fiber ribbon 22 includes 12 optical fibers. However, in other embodiments, ribbons 22 may each include 12 fibers, 16 fibers, 24 fibers, 32 fibers, 36 fibers, etc. In various embodiments, each subunit 20 can include one or more optical fiber ribbons. In the specific embodiment shown, each subunit 20 includes 8 ribbons. In other embodiments, each subunit can include any number of ribbons and any combination of ribbons of different optical fiber counts.

Referring to FIG. 2, to further facilitate good attenuation performance, cable 10 is designed to provide sufficient space for subunits 20 to reposition and assume low stress positions within cable jacket 12 as cable 10 is bent within various installations. As shown in FIG. 2 a relatively low portion of the space within cable jacket 12 is occupied by ribbons 22 and/or subunits 20. In specific embodiments, inner surface 14 of outer cable jacket 12 defines a cable jacket internal cross-sectional area and less than 60% of the cable jacket internal cross-sectional area is occupied by the cross-sectional area of optical fiber ribbons 22. Thus, when cable 10 goes around sheaves, rollers and other bends during installation, or when it is coiled for slack storage, subunits 20 wanting to migrate toward the neutral axis of the bend have the free space available to move in that manner to attain their lowest energy position. This enables good attenuation performance for cable 10.

As noted above, ribbons 22 may be stacked into a ribbon group with the ribbon group stranded to twist longitudinally within a corresponding subunit jacket 24. In various embodiments, the ribbons 22 within each subunit 20 of cable 10 may be stranded at the same ribbon laylength as the other subunits of cable 10. In other embodiments, the ribbons 22 within each subunit 20 of cable 10 may be stranded differently such that ribbons of each subunit have a laylength different than the laylength of the ribbons of other subunits of cable 10. In various embodiments, the laylength of the stranded ribbons 22 within each subunit 20 may be between 300-600 mm. In a specific embodiment, ribbons 22 within one subunit 20 have a laylength of between 450 mm and 550 mm (e.g., 500 mm), and ribbons 22 of a different subunit 20 have a laylength of between 550 mm and 650 mm (e.g., 600 mm).

In yet another embodiment, the ribbons 22 within each subunit 20 of cable 10 may be stranded at the same ribbon laylength as the other subunits of cable 10 but are positioned within cable 10 relative to each other such that the laylength of each subunit is out of phase with the laylength of at least one other subunit. In yet another embodiment, the ribbons 22 within each subunit 20 of cable 10 may be stranded at the same ribbon laylength as the other subunits of cable 10 but are positioned within cable 10 relative to each other such that the laylength of each subunit is in phase with the laylength of at least one other subunit. In one embodiment, ribbons 22 within one subunit 22 may have a right-handed stranding pattern, and ribbons 22 of a different subunit 22 may have a left-handed stranding pattern.

Figure 3:
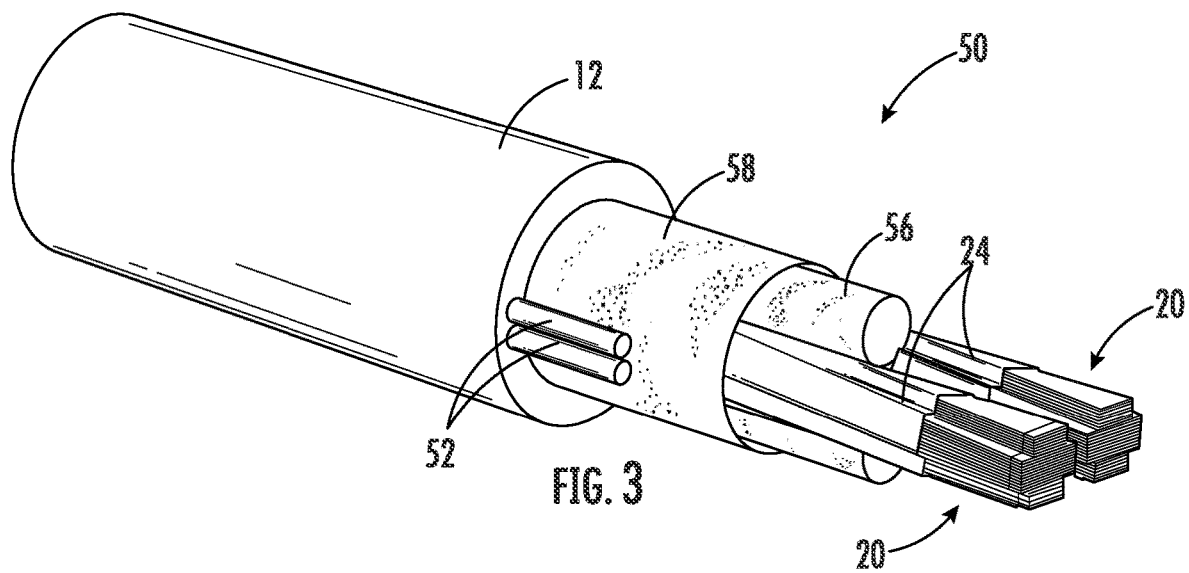
FIG. 3 is a perspective view of an optical fiber cable according to another exemplary embodiment.
Figure 4:
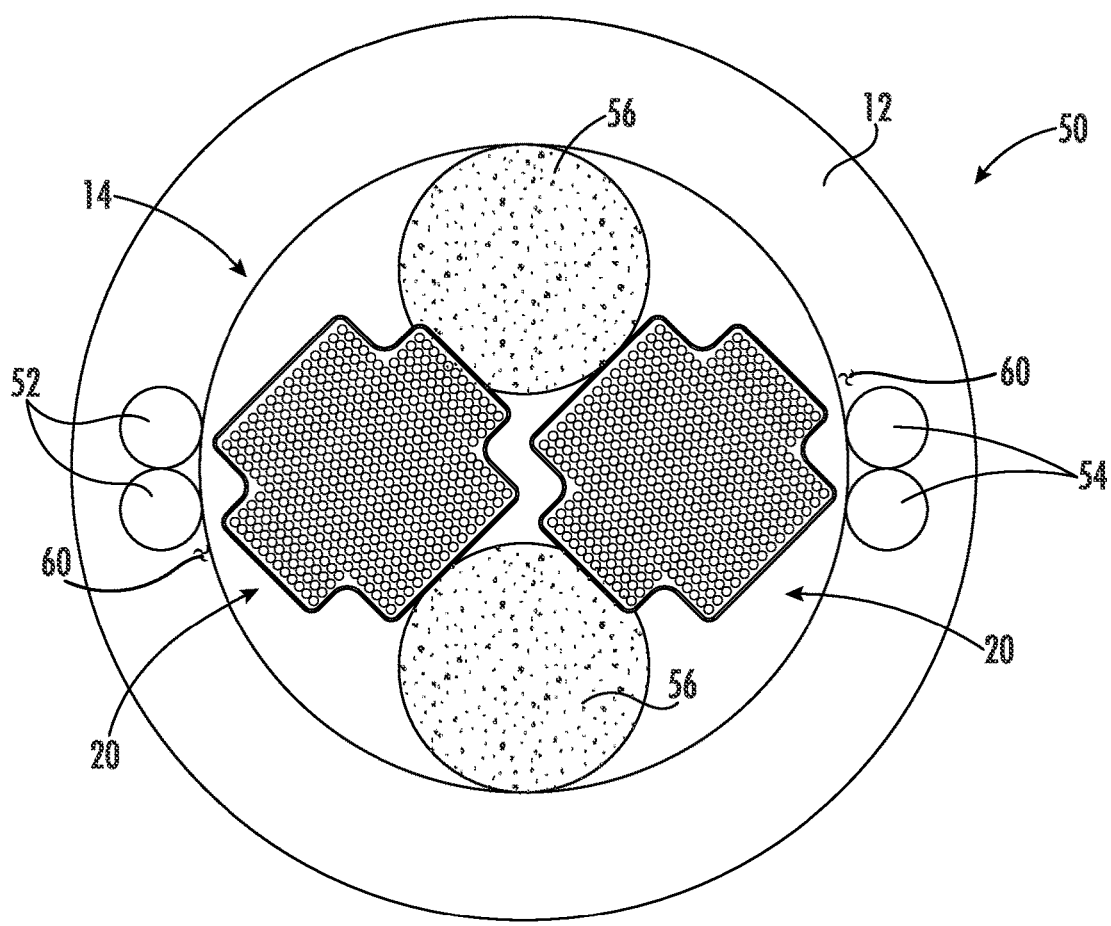
FIG. 4 is a cross-sectional view of the cable of FIG. 3 according to an exemplary embodiment.

Referring to FIGS. 3 and 4, an optical communication cable, shown as cable 50, is shown according to an exemplary embodiment. Cable 50 is substantially the same as cable 10 except for the differences discussed herein. Cable 50 includes two subunits 20 that include a larger number of optical fiber ribbons 22 than the subunits of cable 10. For example, as shown in FIG. 4, each subunit 20 of cable 50 may include 432 fibers. In particular, each subunit 20 of cable 50 includes eight 12-fiber ribbons and fourteen 24-fiber ribbons arranged with the fourteen 24-fiber ribbons sandwiched between a set of four 12-fiber ribbons on either side. In accordance with other aspects of the present disclosure, other subunit fiber counts and configurations are contemplated, including 144 fiber subunits, 216 fiber subunits and 288 fiber subunits.

In the embodiment shown, cable 50 may be an outdoor or outside plant cable. In various embodiments, cable 50 may include at least two elongate tensile strength elements 52 and 54 embedded within outer cable jacket 12 and located on opposing sides of cable jacket 12. In the specific embodiment shown, cable 50 includes a pair of elongate tensile strength elements 52 embedded within the jacket material on one side of cable jacket 12 and a pair of elongate tensile strength elements 54 embedded within the jacket material on the opposing side of cable jacket 12. In this embodiment, because subunits 20 are unstranded within cable jacket 12, the longitudinal length of each subunit jacket 24 of subunits 20 may be substantially the same as a longitudinal length of each of the strength elements 52 and 54. In a specific embodiment, cable 50 is configured to pass various water penetration performance tests and in some such embodiments, the interstitial area within cable jacket 12 may be filled with super-absorbent polymer, water-blocking yarn strands and/or water-blocking tape.

In the specific embodiment shown in FIG. 4, strength elements 52 and 54 are located adjacent to inner surface 14 of cable jacket 12. In another embodiment, strength elements 52 and 54 may be located more toward the center of cable jacket 12 such that a portion of cable jacket material is located between inner surface 14 and the adjacent, outer surfaces of strength elements 52 and 54. Cable 50 may also include one or more rip cords 60 located within cable jacket 12 adjacent to strength elements 52 and 54 to facilitate opening of cable jacket 12.

In addition, cable 50 may include one or more foam rods 56 located within cable 12. Foam rods 56 act to fill some of the space within cable jacket 12. In addition to foam rods 56 taking up space, they are also naturally in the highest stress portion of cable 50 during cable installation. Thus, in various embodiments, foam rods 56 are positioned within cable jacket 12 and are formed to absorb at least some compressive load that can be applied to cable 50. For example, when cable 50 is erroneously pulled over a manhole edge, cable jacket 12 is in contact with the manhole edge and can be referenced as the 'six o'clock' position. Strength elements 52 and 54 will naturally be in the three and nine o'clock positions due to preferential bend. Two parallel subunits 20 will also be at three and nine o'clock as well because they tend to remain along the neutral axis. The portion of jacket 12 at six o'clock is being compressed by load as the cable is being bent over the manhole edge, or any other similar surface or feature applying a compressive force against the cable 10. The foam rod 56 at the six o'clock position inside cable 50 is compressed by jacket 12, and minimal load is distributed to subunits 20 because the foam rod 56 is taking the brunt of the load. The foam rod and jacket at twelve o'clock experience no or very limited compressive force due to the manhole edge. For any given manhole edge situation, either the six or twelve o'clock positions will be engaged, and in either case, the optical fibers within the subunits remain isolated from the bending stress.

In various embodiments, foam rods 56 are free-floating within cable jacket 12, and in other embodiments, foam rods 56 are bonded to the inner surface of jacket 12 to maintain their radial and circumferential orientation. It should be understood that while FIG. 4 shows two, cylindrical foam rods 56, rods 56 can be a variety of different sizes and shapes, and cable 50 can include more or less than two rods 56. In a specific embodiment, rods 56 can be shaped such that its outer surface is curved to generally match the curvature of inner jacket surface 14 and its inner surface is shaped to conform more closely to the shape of subunits 20. In another embodiment, all of the interstitial space around subunits 22 within jacket 12 may be filled with an extruded, extrudable foamed material.

In a specific embodiment, the core of cable 50 is wrapped in water swellable tape 58 which limits water migration along the length of cable 50 in the event of a breach in jacket 12. In other embodiments, foam rods 56 may be located outside water swellable tape 58 to allow them to bond to cable jacket 12, creating positive alignment of the core within the sheath. In an alternative embodiment, cable jacket 12 is formed in an oval shape to create positive alignment, reduce the cross-sectional area, and further enhance the preferential bend characteristic of the cable. In some embodiments, water blocking components (e.g., SAP powders or strands) may also be located within subunits 20 to further facilitate water blocking.

Figure 5:
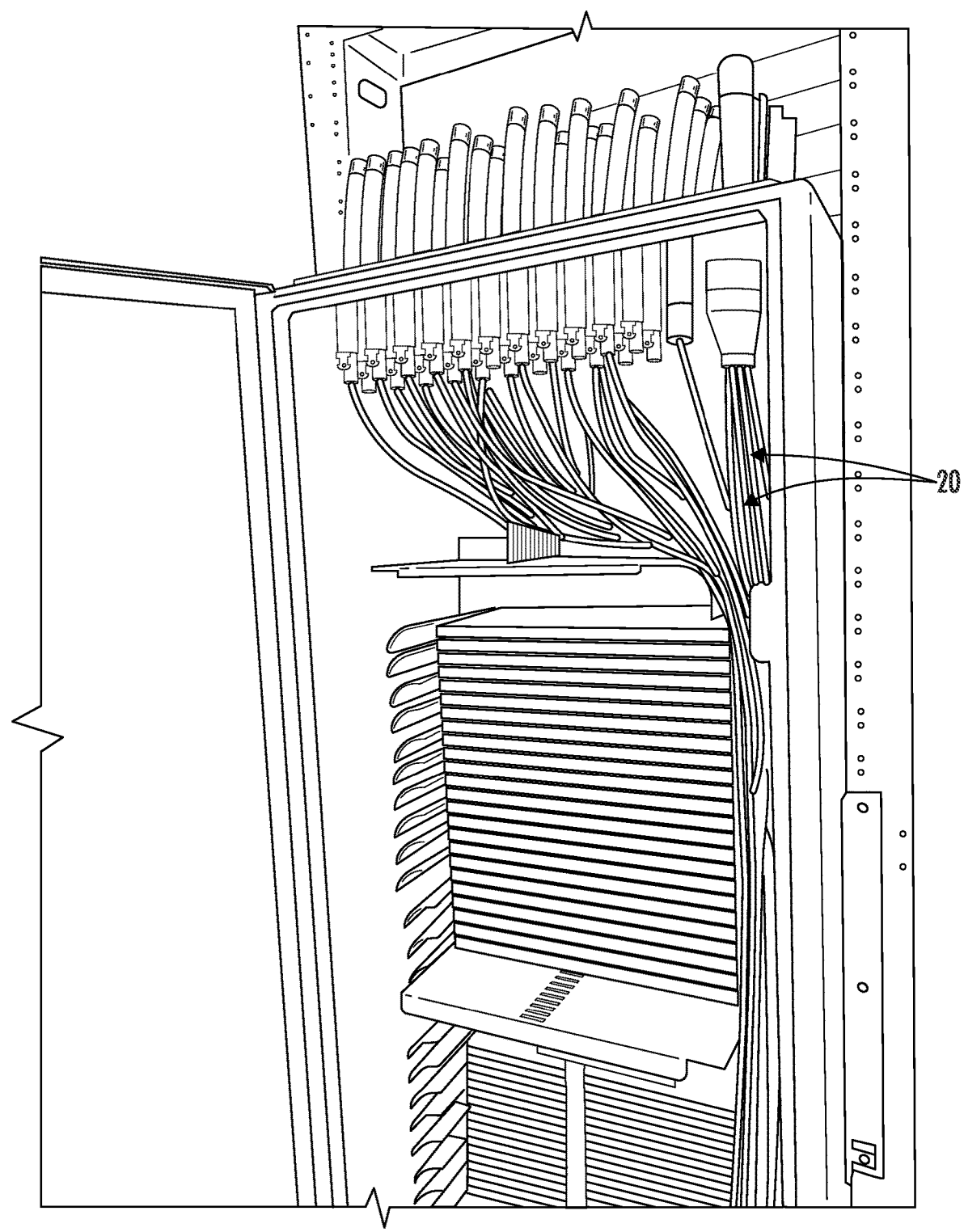
FIG. 5 is a perspective view of a telecommunication cabinet illustrating routing of optical fiber subunits from one or more optical fiber cables according to the exemplary embodiments discussed herein.

FIG. 5 illustrates routing utilizing a cable 10 with unstranded routable subunits 20 to make optical fiber connections within a telecommunications cabinet 80. FIG. 5 shows the organization provided by subunits 20 as the subunits are routed to the desired area within the telecommunications cabinet. Further, subunit jackets 24 provide sufficient protection for the routed subunits, and thus no additional structures are needed to protect the fiber ribbons once accessed from the cable.

Figure 6:
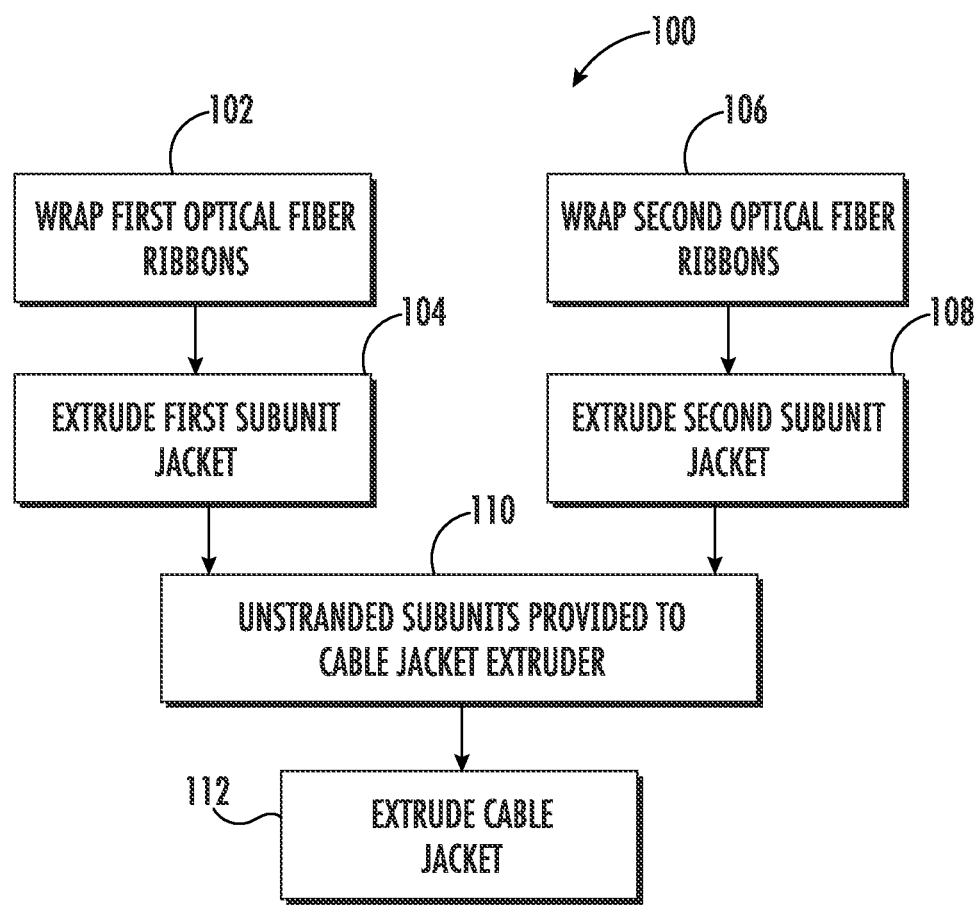
FIG. 6 is a diagram of a process for forming an optical fiber cable having unstranded subunits as discussed herein.

Referring to FIG. 6, a method 100 of forming an optical communication cable is shown. At step 102, a first plurality of fiber optic ribbons are stranded around each other to form a first stranded optical fiber ribbon group. At step 104, a subunit jacket is extruded around the first stranded optical fiber ribbon group to form a first optical fiber ribbon subunit. At step 106, a second plurality of fiber optic ribbons are stranded around each other to form a second stranded optical fiber ribbon group. At step 108, a subunit jacket is extruded around the second stranded optical fiber ribbon group to form a second optical fiber ribbon subunit. At step 110, the first optical fiber ribbon subunit and the second optical fiber ribbon subunit are provided to a cable jacket extruder without stranding either the first optical ribbon subunit or the second optical fiber ribbon. At step 112, an outer cable jacket is extruded around the unstranded first optical fiber ribbon subunit and the unstranded second optical fiber ribbon subunit.

In specific embodiments, the cable formed by method 100 is cable 10 or cable 50 discussed above and includes the structural features of any of the cable components discussed above. In a specific embodiment where method 100 forms cable 10, method 100 includes the step of providing the first optical ribbon subunit and the second optical fiber ribbon subunit to a buffer tube extruder without stranding either the first optical ribbon subunit or the second optical fiber ribbon and extruding a buffer tube around the unstranded first optical fiber ribbon subunit and the unstranded second optical fiber ribbon subunit before extruding the outer cable jacket.

In a specific embodiment of cable 10 with only two subunits 20, the two subunits 20 are made individually on an initial line that extrudes the subunit jacket around the stranded ribbons 22. Then, the two subunits 20 are paid-off in tandem into a buffer tube 26 in a parallel path on a second line that forms buffer tube 26. Next buffer tube 26 is taken up on a reel. Finally, buffer tube 26 is paid off the reel with helically wrapped strength yarns/elements, and then outer jacket 12 is applied, forming the finished cable. Between the tube and jacket steps, the parallel subunits inside the tube may be in any non-controlled rotational position from 0° to 360° about the longitudinal axis due to the lack of stranding at the subunit level. However, on average, subunits 20 are straight and substantially parallel inside buffer tube 26.

Referring to the formation of cable 50, the presence of longitudinal strength elements 52 and 54 embedded in outer jacket 12 creates the preferential bend preference, which is common in some cables with embedded strength elements. In manufacturing and using cable 50 with unstranded subunits 20, the preferential bend feature is exploited. Subunits 20 are formed on the same initial line as discussed above. But unlike when forming cable 10, the next step is the jacketing/final cabling step. The two subunits 20 are paid off into the extrusion crosshead and held in alignment with the embedded strength elements consistently through the cable length. This keeps subunits 20 on the neutral horizontal axis as shown in FIG. 4 during cable bending without the need for them to find their lowest energy state position.

In various embodiments, subunit jacket 24 may be formed from a variety of extruded polymer materials. In various embodiments, subunit jacket 24 is made of a peelable plasticized PVC material tightly extruded to surround each ribbons 22 in each subunit 20. Subunit jacket 24 may be a single extruded layer of plasticized PVC that is both thin (e.g., a thickness of between 0.005 mm and 0.5 mm, specifically, 15 mm and 0.5 mm, and more specifically about 0.25 mm) and comprised of a soft material that easily separates by manually pinching the sheath material. In various embodiments, the elastic modulus of subunit jacket 24 at room temperature is less than 100 MPa and rises to only approximately 800 MPa at cold temperatures (e.g., −10° C.). Various aspects of cable 10 and/or cable 50 discussed below, including bundle jackets 24 and the stranding of ribbons 22 within each subunit 20, may be formed via the methods and materials disclosed in PCT Publication WO 2019/010291, published Jan. 10, 2019, which is incorporated herein by reference in its entirety.

In various embodiments, subunits 20 can include a wide variety of optical fibers including multi-mode fibers, single mode fibers, bend insensitive fibers, etc., including fibers of varying outside diameters such as 250 micron, 200 micron, or smaller dimensioned fibers. In various embodiments, cable jacket 12 and subunit jacket 24 may be a variety of materials used in cable manufacturing, such as polyethylene, polyvinyl chloride (PVC), polyvinylidene difluoride (PVDF), nylon, polypropylene, polyester or polycarbonate and their copolymers. In addition, the material of cable jacket 12 and subunit jacket 24 may include small quantities of other materials or fillers that provide different properties to the material of cable jacket 12. For example, the material of cable jacket 12 and/or subunit jacket 24 may include materials that provide for coloring, UV/light blocking (e.g., carbon black), fire resistance as discussed above, etc.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
    an outer cable jacket;
    a first optical fiber subunit and a second optical fiber subunit surrounded by the outer cable jacket, each of the first optical fiber subunit and the second optical fiber subunit comprising:
        a subunit jacket defining a subunit passage and having a thickness of up to 1 mm; and
        a plurality of optical fibers arranged in an array and configured to be a rollable ribbon such that individual or groups of fiber may be folded or rolled toward other fibers in the array, the rollable ribbon located within the subunit passage;
    wherein the first optical fiber subunit and the second optical fiber subunit are not stranded within the outer cable jacket.

2. The optical fiber cable of claim 1, wherein an inner surface of the outer cable jacket defines a cable jacket internal cross-sectional area, and wherein less than 60% of the cable jacket internal cross-sectional area is occupied by the cross-sectional area of the plurality of optical fiber ribbons.

3. The optical fiber cable of claim 1, wherein the subunit jackets of both the first and second optical fiber subunits comprise an extruded polymer material having a modulus of elasticity of less than 800 MPa at room temperature.

4. The optical fiber cable of claim 3, wherein the elastic modulus of the subunit jackets at room temperature is less than 100 MPa and rises to only approximately 800 MPa at minus ten degrees(−10°) C.

5. The optical fiber cable of claim 1, wherein the subunit jackets are formed from a foamed polymer material.

6. The optical fiber cable of claim 1, wherein the subunit jackets are formed from a solid polymer material.

7. The optical fiber cable of claim 6, wherein the subunit jackets have a thickness of 0.005 mm to 0.5 mm.

8. The optical fiber cable of claim 1, wherein the rollable ribbon does not have a solid matrix surrounding the entire array of fibers forming the rollable ribbon.

9. The optical fiber cable of claim 1, wherein the rollable ribbon comprises individual or groups of fibers intermittently bonded at spaced intervals.

10. The optical fiber cable of claim 1, wherein a longitudinal length of each subunit jacket is within 1% of a longitudinal length of the outer cable jacket.

11. The optical fiber cable of claim 1, further comprising one or more foam rods disposed within the outer cable jacket.

12. The optical fiber cable of claim 11, further comprising a first strength element and a second strength element disposed in the outer cable jacket, wherein the first strength element is diametrically opposed to the second strength element.

13. The optical fiber cable of claim 12, wherein the one or more foam roads comprises a first foam road and a second foam rod, wherein the first foam rod is diametrically opposed to the second foam rod, and wherein, in a cross-sectional view perpendicular to a longitudinal length of the optical fiber cable, an axis extending through the first foam rod and the second foam rod is transverse to an axis extending through the first strength element and the second strength element.

14. The optical fiber cable of claim 1, further comprising a buffer tube, wherein the buffer tube is disposed within the outer cable jacket and wherein the first optical fiber subunit and the second optical fiber subunit are disposed within the buffer tube.

15. The optical fiber cable of claim 14, wherein a longitudinal length of each subunit jacket is within 1% of a longitudinal length of the buffer tube.

16. The optical fiber cable of claim 14, further comprising at least one of a plurality of strands or water blocking tape disposed between the outer cable jacket and the buffer tube.

* * * * *